United States Patent
Gorman

(10) Patent No.: US 7,370,047 B2
(45) Date of Patent: *May 6, 2008

(54) SYSTEM AND METHOD FOR FILTERING AND SORTING DATA

(75) Inventor: John G. Gorman, Del Mar, CA (US)

(73) Assignee: Deep Sky Software, Inc., San Diego, CA (US)

( * ) Notice: Subject to any disclaimer, the term of this patent is extended or adjusted under 35 U.S.C. 154(b) by 408 days.

This patent is subject to a terminal disclaimer.

(21) Appl. No.: 10/776,440

(22) Filed: Feb. 10, 2004

(65) Prior Publication Data

US 2004/0163039 A1    Aug. 19, 2004

Related U.S. Application Data

(63) Continuation of application No. 09/823,406, filed on Mar. 30, 2001, now Pat. No. 6,738,770.

(51) Int. Cl.
*G06F 17/30* (2006.01)
*G06F 17/00* (2006.01)

(52) U.S. Cl. .......................................... 707/7; 707/102

(58) Field of Classification Search .............. 707/1–10, 707/101–102; 715/503, 501.1
See application file for complete search history.

(56) References Cited

U.S. PATENT DOCUMENTS

| | | | |
|---|---|---|---|
| 5,317,686 A | 5/1994 | Salas et al. | |
| 5,339,392 A | 8/1994 | Risberg et al. | |
| 5,396,621 A * | 3/1995 | MacGregor et al. | 715/809 |
| 5,572,644 A | 11/1996 | Liaw et al. | |
| 5,701,400 A | 12/1997 | Amado | |
| 5,712,020 A | 1/1998 | Parker | 428/182 |
| 5,768,158 A | 6/1998 | Adler et al. | 716/11 |
| 5,787,001 A | 7/1998 | Dietrich et al. | 700/97 |
| 5,842,180 A | 11/1998 | Khanna et al. | 705/30 |
| 5,890,174 A | 3/1999 | Khanna et al. | 715/504 |
| 5,893,123 A | 4/1999 | Tulnenga | |
| 5,907,836 A * | 5/1999 | Sumita et al. | 707/2 |
| 5,966,716 A | 10/1999 | Comer et al. | 707/203 |
| 6,256,649 B1 | 7/2001 | Mackinlay et al. | 715/503 |

(Continued)

OTHER PUBLICATIONS

Chester and Alden. (1997) Excel 97 Fourth Edition.

(Continued)

*Primary Examiner*—Uyen Le
(74) *Attorney, Agent, or Firm*—Fish & Richardson P.C.

(57) ABSTRACT

System and method for filtering and sorting data. The system includes data management system for displaying a data table having a plurality of rows and columns of data cells. Each of the columns in the data table has an associated filter cell whereby the user may input filter criteria. In response to receiving the filter criteria in the filter cells, a data management system filters and sorts each of the data cells in the data table. In one embodiment of the invention, the data management system records the order in which the user inputs the filter criteria and generates a sorting priority list that defines a sorting priority for the data cells. The data management system sorts the data cells using the sorting priority list. Furthermore, in one embodiment of the invention, the data management system displays the data cells that satisfy the filter criteria contiguously and interleaved between those data cells that do not satisfy the filter criteria.

48 Claims, 19 Drawing Sheets

U.S. PATENT DOCUMENTS

| | | | |
|---|---|---|---|
| 6,266,805 B1 | 7/2001 | Nwana et al. | 717/104 |
| 6,779,152 B1* | 8/2004 | Conner et al. | 715/509 |
| 6,859,907 B1* | 2/2005 | McGarry | 715/503 |
| 6,883,136 B1* | 4/2005 | Weinberg et al. | 715/504 |
| 2002/0080170 A1* | 6/2002 | Goldberg et al. | 345/748 |

OTHER PUBLICATIONS

Chester and Alden. (Sybex, 4th ed. 1997) Mastering Excel 97. pp. 23, 294.

* cited by examiner

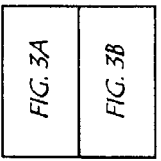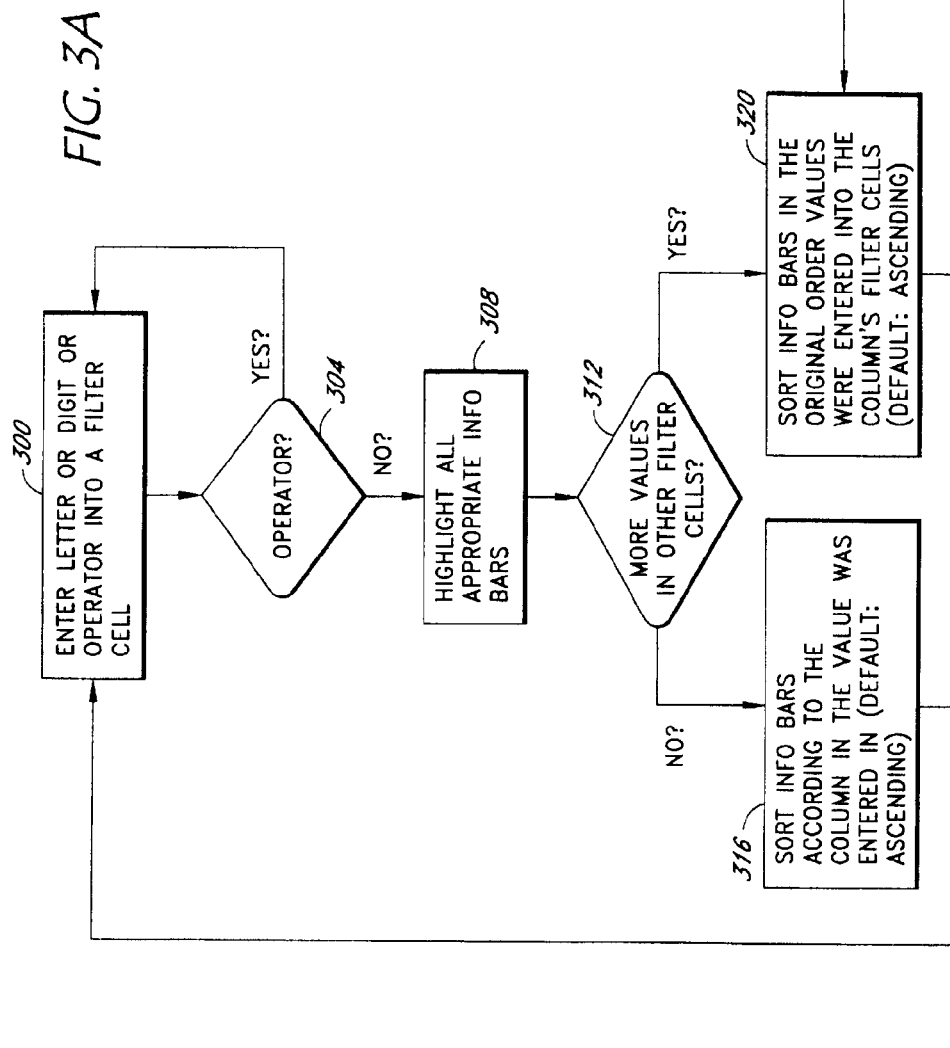

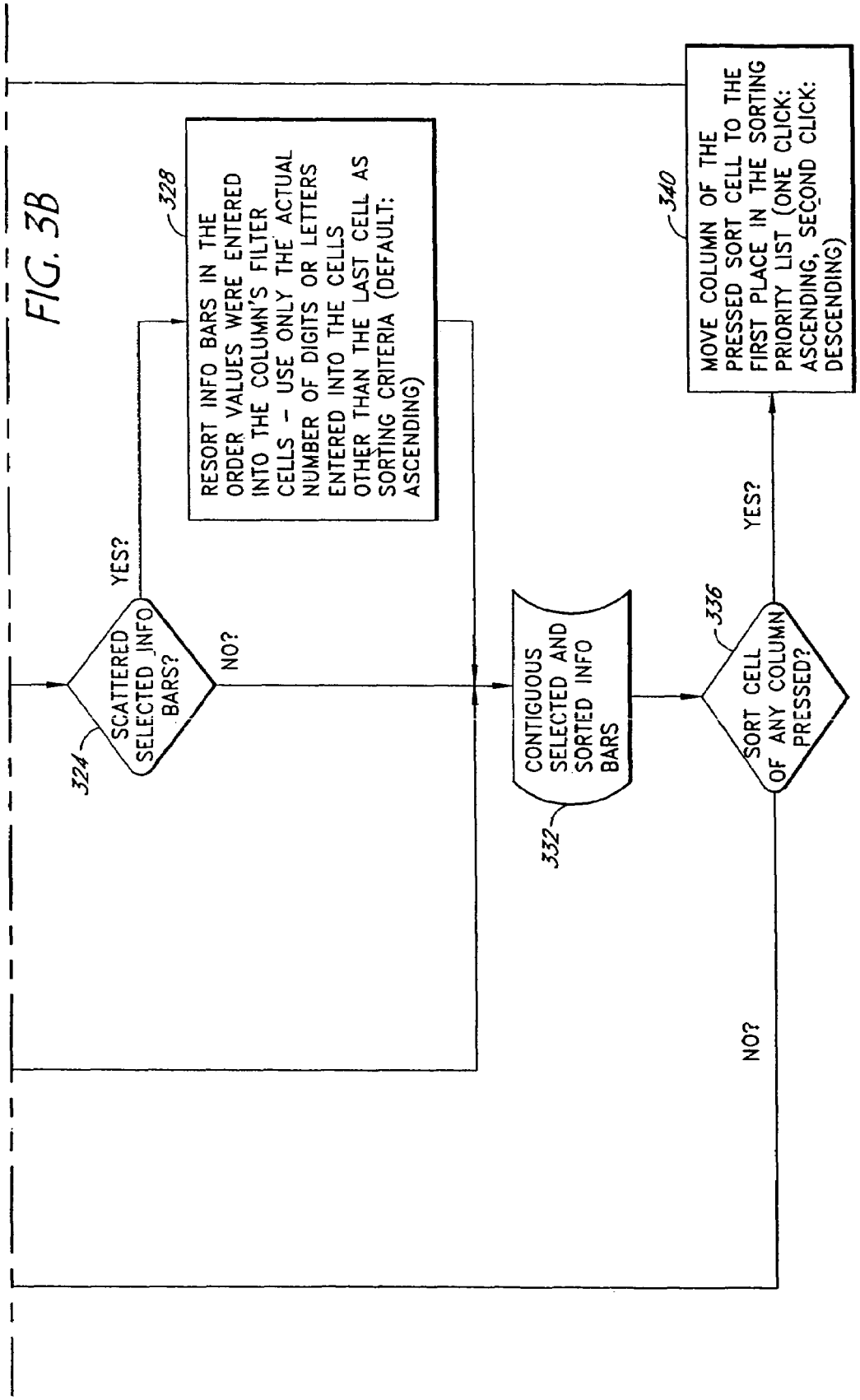

FIG. 4B

INTERACTION BETWEEN THE
FILTER BAR AND THE SORT BAR

| Last Name | First Name | ZIP |
|---|---|---|
| ALLEN | BARBARA | 5 1 2 3 4 |
| ALLEN | ADAM | 5 1 3 9 4 |
| ALLEN | BARBARA | 5 1 3 3 4 |
| ALLEN | ADAM | 4 1 2 3 4 |
| BINGHAM | ADAM | 5 1 2 3 4 |
| BINGHAM | BABS | 5 1 2 3 4 |
| BINGHAM | BERT | 5 3 3 3 4 |
| BINGHAM | ERWIN | 5 1 2 3 4 |
| BINGHAM | BARBARA | 5 1 2 3 4 |
| CARSON | ADAM | 5 1 2 3 4 |
| CARSON | BARBARA | 6 1 3 9 4 |
| CARSON | ADAM | 5 1 3 3 4 |
| CARSON | ADAM | 5 1 3 3 4 |

EXAMPLE 1-3

*FIG. 4C*

INTERACTION BETWEEN THE
FILTER BAR AND THE SORT BAR

| | Last Name | First Name | ZIP |
|---|---|---|---|
| | | | 5 |
| | ALLEN | ADAM | 4 1 2 3 4 |
| | ALLEN | BARBARA | 5 1 2 3 4 |
| | ALLEN | BARBARA | 5 1 3 3 4 |
| | ALLEN | ADAM | 5 1 3 9 4 |
| | BINGHAM | ADAM | 5 1 2 3 4 |
| | BINGHAM | BABS | 5 1 2 3 4 |
| | BINGHAM | BARBARA | 5 1 2 3 4 |
| | BINGHAM | ERWIN | 5 1 2 5 4 |
| | BINGHAM | BERT | 5 3 3 3 4 |
| | CARSON | ADAM | 5 1 2 3 4 |
| | CARSON | ADAM | 5 1 3 3 4 |
| | CARSON | ADAM | 5 1 3 3 4 |
| | CARSON | BARBARA | 6 1 3 9 4 |

EXAMPLE 1-6

| STRING ENTERED | POSSIBLE RESULTS |
|---|---|
| GO* | GONZALES<br>GORDON |
| *SKI | ADAMSKI<br>SKINNER |
| A?ert | ALERT<br>ABERT<br>ANERT |
| A??rt | ANERT<br>ADART<br>AMURT |

SYSTEM AND METHOD FOR FILTERING AND SORTING DATA

RELATED APPLICATION

This application is a continuation application, and claims the benefit under 35 U.S.C. § 120 of application Ser. No. 09/823,406 filed on Mar. 30, 2001 now U.S. Pat. No. 6,738,770, which is hereby incorporated by reference herein.

BACKGROUND OF THE INVENTION

1. Field of the Invention

The field of the invention relates to database systems. More particularly, the field of the invention relates to a system and method of filtering, sorting, and displaying data that is managed by a database system.

2. Description of the Related Technology

A graphical user interface program, such as a spreadsheet, is often used to display and manipulate data that is managed by a database. To organize the data, the spreadsheet typically displays to the user a data table that includes a plurality of rows and columns of data cells, each of the data cells displaying certain data items from the database.

Although a number of spreadsheet programs for various applications are in commercial use, these programs are limited in that they do not readily allow an unsophisticated user to filter and sort multiple columns of data cells in a data table.

For example, although many spreadsheet programs allow a user to filter data, they require the user to input a complicated set of instructions using "pull down" menu commands. A pull down menu command is a feature that can be selected from a menu bar that is displayed at the top of a screen by the spreadsheet programs. The menu bar contains various commands that may be selected by a user via the keyboard or mouse.

Furthermore, these spreadsheet programs do not dynamically respond to input filter criteria as it is typed by the user. For example, in known systems, a user is required to input the filter criteria in a filter criteria window that is separate from the data table. For example, assume a user is using the spreadsheet program to manage personnel data, and the user desires to find the record for Sarah Shievelniche. In this example, the user would be required to open the spreadsheet's filter window, and type in the name of the individual they were looking for, i.e., Sarah Shievelniche. If the user typed in her name incorrectly, the user would need to return to the filter menu and try different filter criteria. Such a process is time consuming since the user continually needs to re-request the spreadsheet program to display the filter criteria window to input new filter criteria.

Another disadvantage of known spreadsheet programs is that they do not display the data that satisfies the search criteria in the context of the data that does not satisfy the search criteria. Often, despite errors in entering filter criteria the desired information would be seen if the user was allowed to see the data cells that do not satisfy the search criteria. For example, using the above example, if the user entered the filter criteria "Sheivelniche", the spreadsheet program would not find Sarah Shievelniche because the user had incorrectly typed her last name, i.e., the letter "i" and the letter "e" were reversed. However, if the spreadsheet program had displayed the data for those users having names close to the misspelled name, it is likely that the user could readily find the desired information despite his error.

Thus, there is a need for a system and method for easily filtering multiple columns of data grids. The system and method should automatically filter and sort the data cells in dynamic response to receiving filter criteria. Furthermore, if desired, the system should allow the user to see those data cells that satisfy the filter criteria in the context of those data cells that do not satisfy the filter criteria.

SUMMARY OF CERTAIN INVENTIVE ASPECTS

One aspect of the invention includes a method of managing data, the method comprising displaying in a single window a plurality of filter cells and a table comprising a plurality of rows and columns of data cells, wherein the content of each of the data cells belongs to at least one data set, wherein each of the columns or rows has an associated sort procedure, and wherein each of the data cells is associated with at least one of the filter cells receiving filter criteria via one or more of the filter cells identifying which of the data cells contain data that satisfies the filter criteria of the filter cell that is associated with the data cells; and sorting the data sets of the identified data cells, wherein the sorting is based at least in part upon one of the sort procedures.

Another aspect of the invention includes a system for managing data, the system comprising means for displaying a table comprising a plurality of rows and columns of data cells, wherein a number of the rows or columns of cells of the table have an associated filter cell and an associated sort procedure, and wherein the content of each of the data cells belongs to at least one data set means for receiving filter criteria via one or more of the filter cells means for identifying which of the data cells satisfy the filter criteria that is associated with the respective data cells; and means for sorting the data sets of the identified data cells, wherein the sorting is based at least in part upon one of the sort procedures.

Yet another aspect of the invention includes a system for managing data, the system comprising a module for displaying a table comprising a plurality of rows and columns of data cells, wherein a number of the rows or columns of cells of the table have an associated filter cell and an associated sort procedure, and wherein the content of each of the data cells belongs to at least one data set a module for receiving filter criteria via one or more of the filter cells a module for identifying which of the data cells satisfy the filter criteria that is associated with the respective data cells; and a module for sorting the data sets of the identified data cells, wherein the sorting is based at least in part upon one of the sort procedures.

And yet another aspect of the invention includes a method of managing data, the method comprising displaying a table comprising a plurality of rows and columns of data cells, wherein a number of the rows or columns of cells of the table have an associated filter cell and an associated sort procedure, and wherein the content of each of the data cells belongs to at least one data set receiving filter criteria via one or more of the filter cells generating a sorting priority list that defines a sorting order for the sort procedures, wherein the sorting priority list is generated based at least in part upon the order in which a user enters filter criteria in the filter cells identifying which of the data cells satisfy the filter criteria that is associated with the respective data cells sorting the data sets of the identified data cells, wherein the sorting is based at least in part upon one of the sort procedures and the sort priority list; and displaying the sorted data sets of data cells, wherein the satisfying cells are displayed contiguously and interposed between non-satisfying data cells, wherein the data cells are identified, sorted, and displayed in response to receiving character-by-character input or upon the lapse of a preset pause period subsequent to not receiving character input, and wherein the data sets associated with the identified data cells are graphically identified to a user via highlight, color or other image marking that is different from the highlight, color, or image marking that is used for the non-satisfying data cells.

BRIEF DESCRIPTION OF THE DRAWINGS

FIG. 3 is a flowchart illustrating one embodiment of a process of filtering and sorting data that forms a part of the data management system of FIG. 1.

FIG. 4B is a screen display illustrating the data table of FIG. 4A subsequent to a user entering the filter criteria "b" in the first column of the data table.

FIG. 4C is a screen display illustrating the data table of FIG. 4B subsequent to the data cells being sorted.

FIG. 4E is a screen display illustrating the data table of FIG. 4D subsequent to filtering and sorting the data in the table in response to receiving the filter criteria "5."

FIG. 4G is a screen display illustrating the data table of FIG. 4F subsequent to filtering and sorting the data in the table in response to receiving the filter criteria "b" in the second column of the data table.

FIG. 7 is another exemplary screen display that may be generated by the data management system of FIG. 1.

FIG. 8 is a chart illustrating certain types of wildcard filter tokens that may be provided as filter criteria to the data management system of FIG. 1.

FIG. 12 is an exemplary screen display illustrating that data cells that satisfy filter criteria are shown in the context of those data cells that do not satisfy the filter criteria.

DETAILED DESCRIPTION OF CERTAIN EMBODIMENTS OF THE INVENTION

The following detailed description is directed to certain specific embodiments of the invention. However, the invention can be embodied in a multitude of different ways as defined and covered by the claims.

Figure 1:
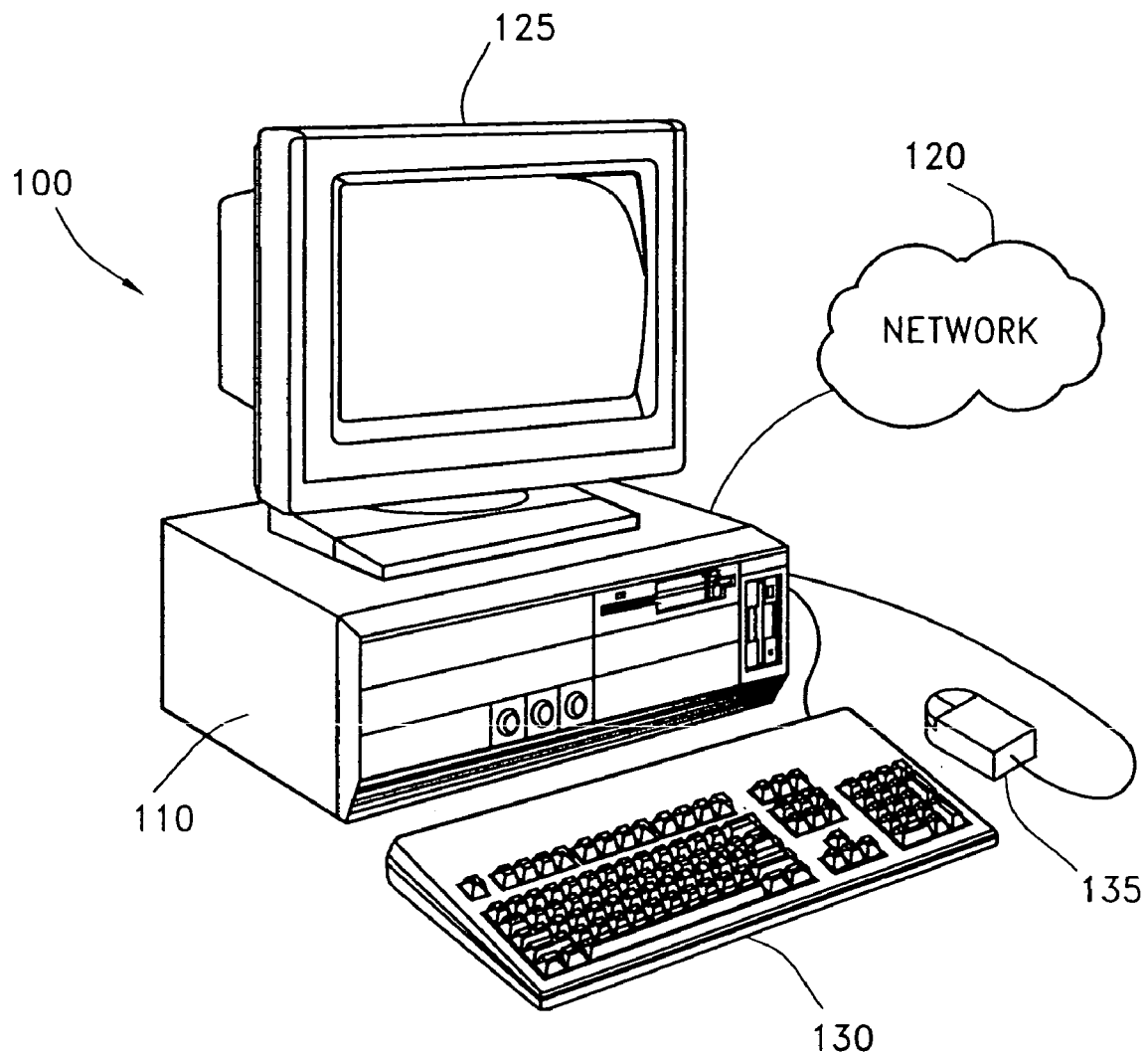
FIG. 1 is a diagram illustrating one embodiment of a data management system.

FIG. 1 is a diagram illustrating one embodiment of a data management system 100. The database management system 100 can be used to manage any type of data, e.g., business, educational, personal, medical, and tax. The database management system 100 includes at least one computing device 110, e.g., a computer in the embodiment of FIG. 1. If the database management system includes more than one computer 110, the computers may be interconnected via a network 120 to form a computing environment.

Figure 2:
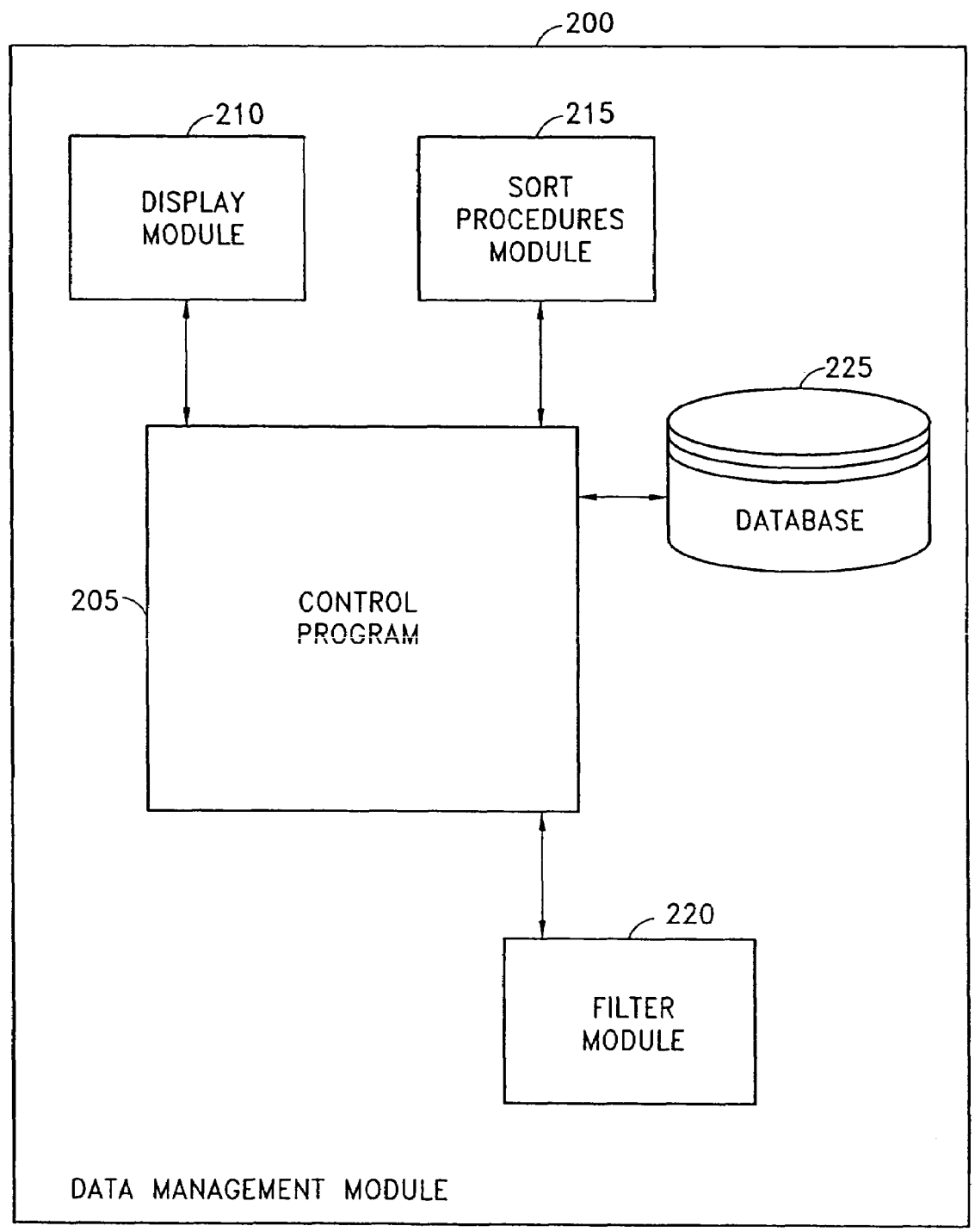
FIG. 2 is a block diagram illustrating certain software modules that are part of the data management system of FIG. 1.

The computer 110 can include a microprocessor and other hardware for executing a data management module 200 (FIG. 2). The microprocessor may be any conventional general purpose single- or multi-chip microprocessor such as a Pentium® processor, a Pentium® Pro processor, a 8051 processor, a MPS® processor, a Power PC® processor, or an ALPHA® processor. In addition, the microprocessor may be any conventional special purpose microprocessor such as a digital signal processor.

The computer is connected to a display 125 and at least one input device. Using the input device and display 125, a user can selectively view the data that is managed by the data management system 100. The input device may be a keyboard 130, mouse 135, rollerball, pen and stylus, or voice recognition system. The input device may also be a touch screen associated with the display 125. The user may respond to prompts on the display by touching the screen. Textual may be entered by the user through the input device. Together these elements may be embodied as a variety of computing devices such as a personal digital assistant (PDA), cellular telephone, laptop computer, set top box, and so forth.

The network 120 may include any type of electronically connected group of computing devices including, for instance, the following networks: Internet, Intranet, Local Area Networks (LAN) or Wide Area Networks (WAN). In addition, the connectivity to the network may be, for example, remote modem, Ethernet (IEEE 802.3), Token Ring (IEEE 802.5), Fiber Distributed Datalink Interface (FDDI) or Asynchronous Transfer Mode (ATM). Note that networked computing devices may be desktop, server, portable, hand-held, set-top, or any other desired type of configuration. As used herein, an Internet network may include network variations such as public Internet, a private Internet, and a secure Internet. Furthermore, the network could be configured as a private network, a public network, a value-added network, an intranet, and the like.

FIG. 2 illustrates certain software components of one embodiment that are part of a data management module 200 that executes on the data management system 100 (FIG. 1). In one embodiment, the database management module 200 includes a control program 205, a display module 210, a sort procedure module 215, a filter module 220, and a database 225. As can be appreciated by one of ordinary skill in the relevant technology, each of the modules 205-225 may comprise various sub-routines, procedures, definitional statements, and macros. Each of the modules 205-225 are typically separately compiled and linked into a single executable program. Therefore, the following description of each of the modules 205-220 is used for convenience to describe the functionality of the data management module 200. Thus, the processes that are undergone by each of the modules 205-225 may be arbitrarily redistributed to one of the other modules, combined together in a single module, or made available in a shareable dynamic link library.

The modules 205-220 and the database 225 may each be written in any programming language such as C, C++, BASIC, Pascal, Java, and Fortran and executed under any well-known or proprietary operating system. C, C++, BASIC, Pascal, Java, and Fortran are industry standard programming languages for which many commercial compilers can be used to create executable code.

Furthermore, depending on the one embodiment of the invention, certain ones of the modules 205-220 and/or the database 225 reside and execute on a computer that is external to the computer 110. For example, the database 225 may reside in a database server that is remotely accessible by various client computing devices such as the computer 110.

FIG. 3 is flowchart illustrating one embodiment of a process of filtering and sorting data that is performed by the data management system 100 (FIG. 1). Depending on the embodiment, the ordering of the states may be re-arranged, additional states may be added, and others may be omitted. Before starting at a state 300, a user has executed the data management module 200 on the data management system 100. The data management system 100 has displayed at least one data table on the display 125.

Figure 4A:
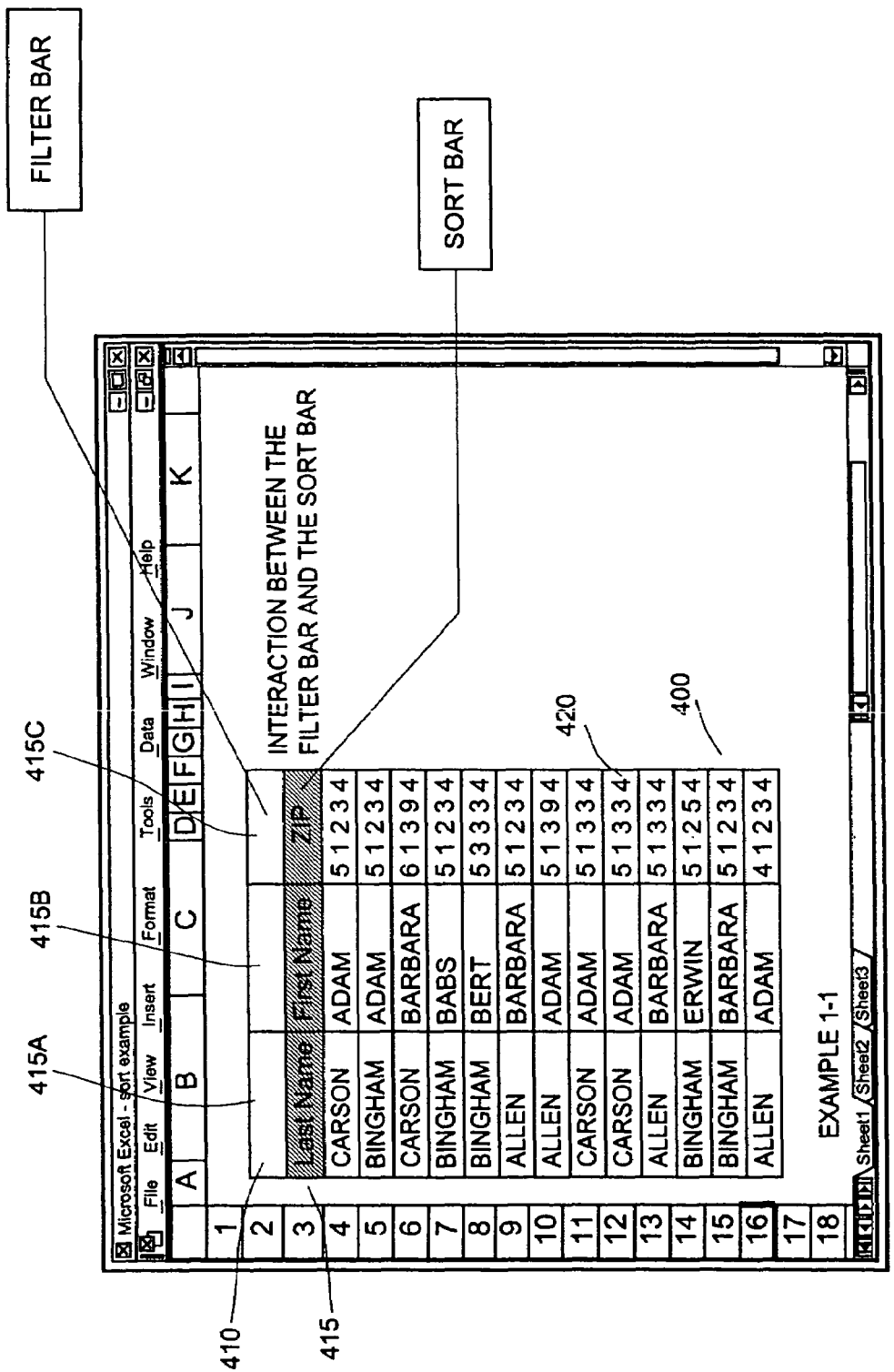
FIG. 4A is a screen display of an exemplary data table displayed by one embodiment of the data management system of FIG. 1.

For example, FIG. 4A illustrates an exemplary table 400. The table 400 includes a plurality of data cells 420 arranged in columns and rows. As shown in FIG. 4A, and by way of example only, each of the data cells falling within a selected row describes demographic or contact information of an individual. Moving across the row, each data cell that falls within a different column holds a certain type of information regarding the individual. For example, the left-most column of table 400 contains the last name of individuals, the second column holds the first name of the individuals, and the third column holds the zip codes of the individuals. For convenience of description, all of the data cells in a selected row in the table 410 may be collectively referred to as an "information bar" or as "a data set".

Each of the columns has an associated filter cell 410 and sort cell 415. Using an input device, such as the keyboard 130, a user can input filter criteria into the filter cells 410. As will be discussed in further detail below, the data management system 100 filters and sorts the data in the data cells in response to receiving filter criteria. The user may designate a sort algorithm for each of the columns in the table 400. By selecting one of the sort cells 415, e.g., the cell named "Last Name", the user can toggle between different sorting algorithms. For example, in one embodiment of the invention, two sorting algorithms are associated with each of the sort cells, i.e., an alphabetical sort and a reverse alphabetical sort. In another embodiment of the invention, the user can configurably set the sort algorithm that is associated with each of the sort cells.

It is to be appreciated that the number of column and rows in the table 400 will vary depending on the embodiment. Furthermore, the type of data that is stored in the table 400 will vary depending upon the application.

Referring again to FIG. 3, starting at a state 300 the user enters a letter, digit, or keyword operator into one of the filter cells 410. For example, in one embodiment an operator can include a symbol that is representative of one or more of the following functions: NOT, GREATER THAN, LESS THAN, NEAR, DISTANT FROM, AND or OR. For example, the NOT operator indicates that data satisfying the operator should not be selected. The filter criteria "NOT bob" selects all data cells in the respective column that do not have the keyword "bob". Furthermore for example, the GREATER THAN operators indicates that data that is greater than the value following the operator should not be selected. For example, the filter criteria ">f" selects all data cells that have as their first character the letter "f" or another character that is subsequent to "f" in the alphabet. Furthermore, the filter criteria ">8" selects all data cells that have as their first character the number 8 or is higher numerically than the number 8. It is to be appreciated that the other exemplary operators are to be given their ordinary meaning.

As is shown in FIG. 4A, the filter and sort cells of each of the columns is located at the top of each of columns. It is to be appreciated by a skilled technologist that it is not necessary that the filter cell be located in this position but can be located at other positions on the display 125. For convenience of description, the filter cell that is associated with a selected column of data cell is referred to below as "a column's filter cell." Since the filter cell is displayed to the user in the same window as the data table, users, whether novice, proficient, or any other level, can readily make use of the filtering features of the data management system 100 without relying upon pull down menus or other command sequences.

Proceeding to a decision state 304, the data management system 100 determines whether the user entered an operator into one of the filter cells. If the user enters an operator, the data management system 100 returns to the state 300 to receive other parameters regarding the provided operator. However, if the user did not input an operator, i.e., the user input a letter or digit, the data management system 100 proceeds to a state 308 wherein all data cells satisfying the criteria input into the filter cell are highlighted or otherwise visually identified to the user on the display 125. In one embodiment of the invention, the data management system 100 also highlights the data cells falling within the same rows, i.e., information bars, as the identified data cells.

Figure 4B:
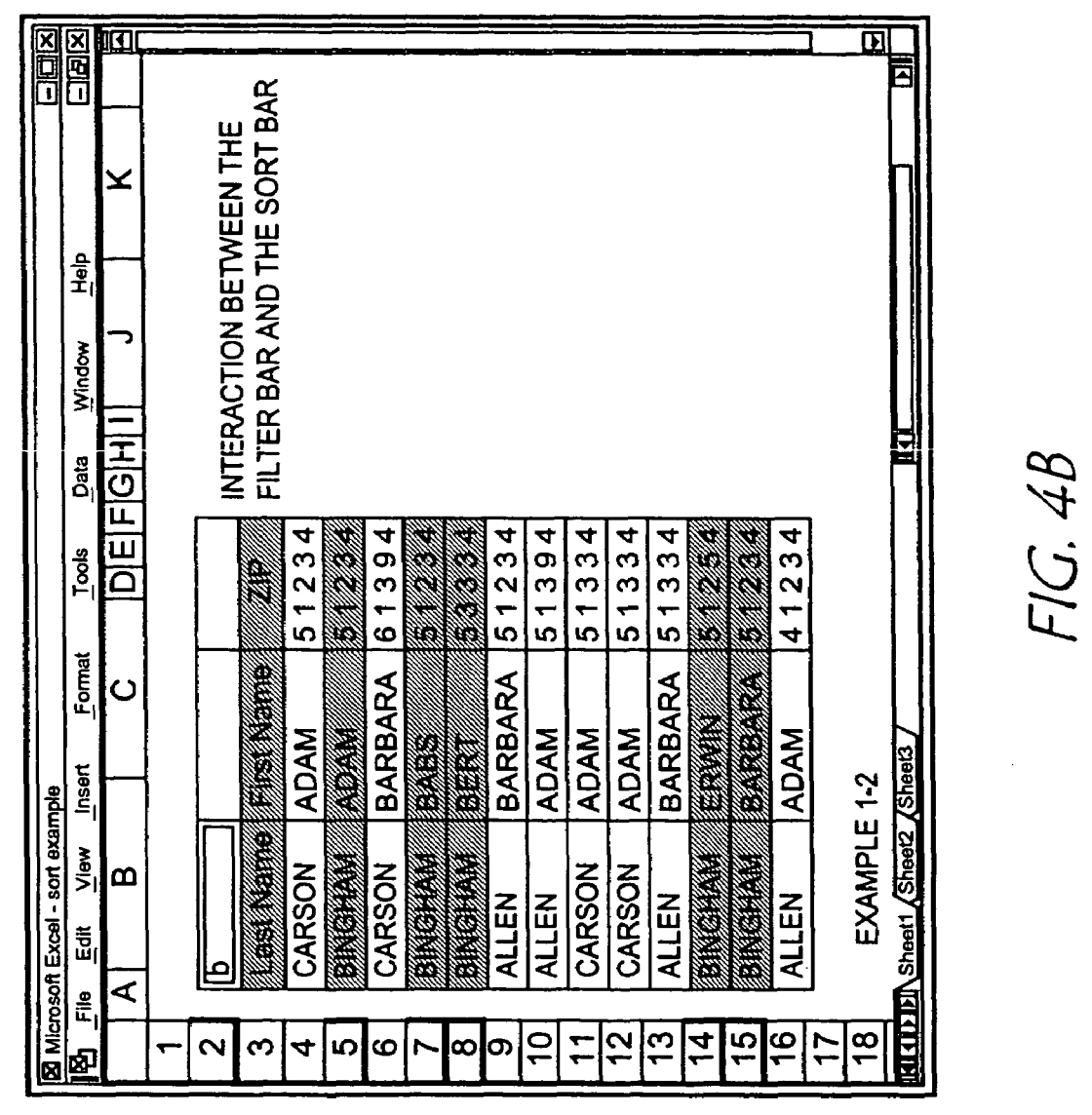

For example, referring to FIG. 4B, by visual inspection it is seen that the user entered the filter criteria "b" into the first column of the table 400. In response, the data management system 100 identified and highlighted each of the data cells in the first column that had data starting with the letter "b". Furthermore, the data management system 100 also highlighted each of the data cells falling within the same row as the identified data cells, e.g., "Adam", "Babs", "Bert", "Erwin" and "Barbara", since these data cells are in the same information bar as those data cells whose content satisfy the filter criteria.

Continuing to a decision state 312 from state 308, the data management system 100 determines whether the user entered filter criteria in any of the other filter cells, e.g., cells 415a, 415b, 415c. If filter criteria was not entered in any of the other filter cells, the data management system 100 moves to a state 316, wherein the information bars are sorted according to the order that filter criteria was entered. Thus, as is seen in FIG. 4C, the data management system 100 sorted the information bars using the currently selected primary sort algorithm of the column receiving the filter criteria, i.e., the last name column. Of course, the sort order may vary according to the embodiment.

Referring again to decision state 312, if the user has input filter criteria in more than one of the filter cells, the data management system 100 proceeds to a state 320. At the state 320, the data management system 100 sorts each of the information bars based upon a sorting priority list. In one embodiment of the invention, the sorting priority list is used to record the order that filter cells of the columns are used.

The database management system 100 sorts the information bars, using as the primary sort algorithm the sort algorithm of the first column that the user applied filter criteria. For example as is shown in FIGS. 4A-4E, if the user input filter criteria in the filter cells in the order of column one and then column three, the data management system 100 does a primary sort of the data cells based upon the sort algorithm of the first column, then a secondary sort of the information bars based upon third column. It is noted that secondary, tertiary, and subsequent sort are typically only used when there are identical entries in the data cells using the primary sort. For example, as is shown in FIG. 4E, the database management system 100 performs a secondary sort using the sort algorithm of the third column since there are multiple entries for all, "Allen", "Bingham", and "Carson" in the first column.

Figure 4D:
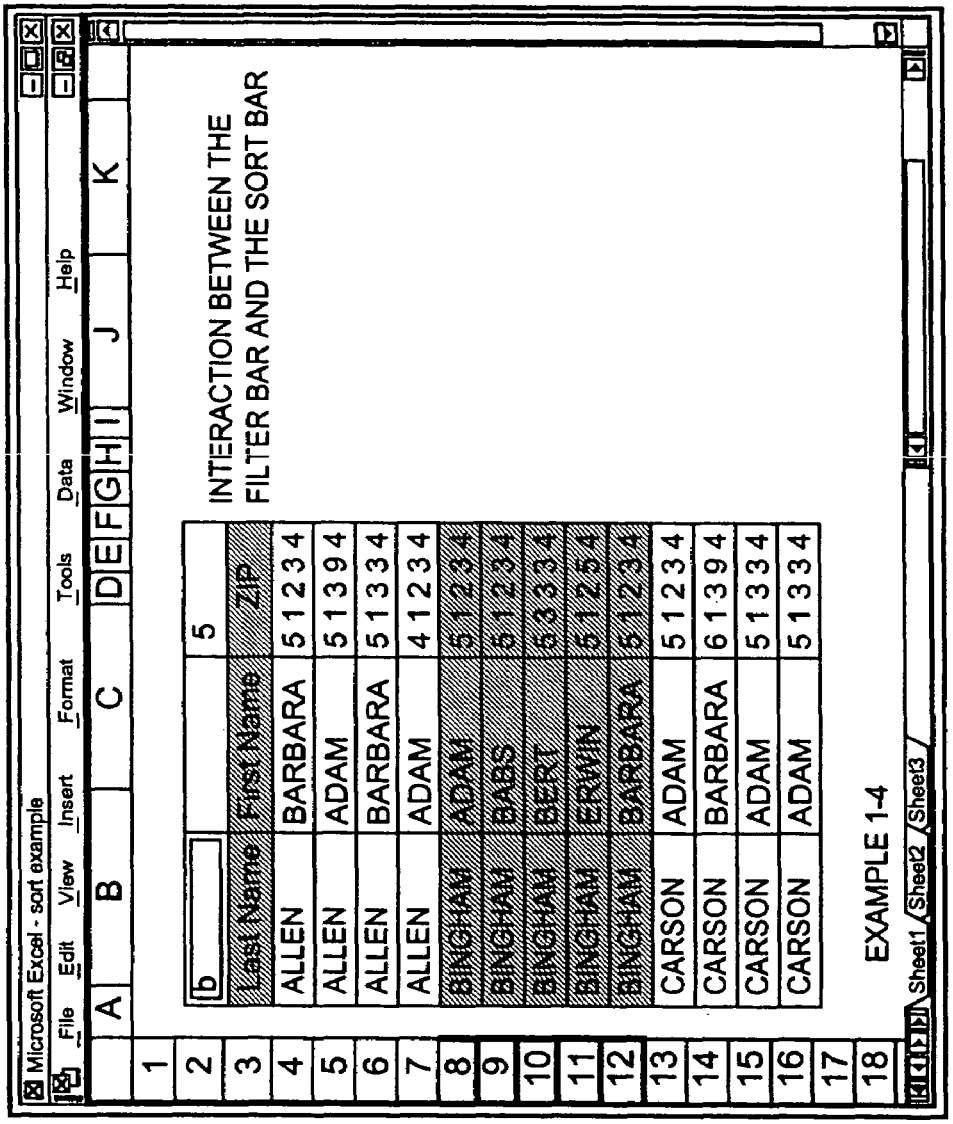
FIG. 4D is a screen display illustrating the data table of FIG. 4C subsequent to receiving from a user the filter criteria "5" in the third column of the data table.
Figure 4F:
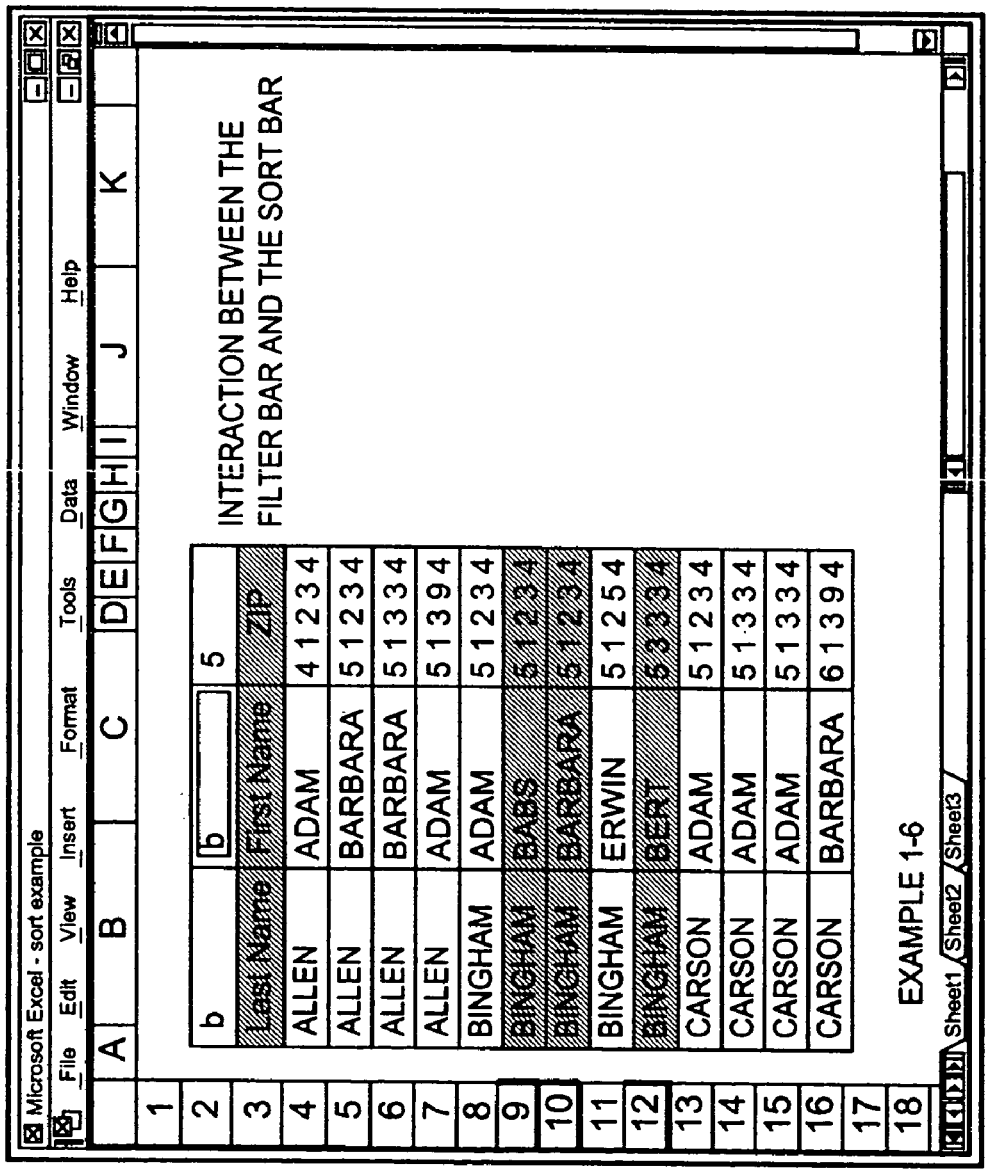
FIG. 4F is a screen display illustrating the data table of FIG. 4E subsequent to receiving from the user the filter criteria "b" in the second column of the data table.

Continuing from state 320 to a decision state 324, the data management system 100 determines whether any data cells that do not satisfy the filter criteria are interleaved within the data cells that do satisfy the filter criteria. For example, FIG. 4f illustrates the ordering of the data cells after the user input a third set of filter criteria, i.e., the letter "b" in the second column. Upon performing a sort of the data cells using the sorting priority list, the information bar for "Erwin" is prior to the information bar for "Bert." In one embodiment of the invention, the data management system 100 reorders the information such that satisfying data cells are grouped continuously together. In this embodiment, if the data management system 100 determines that data cells that satisfy the filter criteria are interleaved with data cells that do not satisfy the filter criteria, the data management system 100 proceeds to a state 328 to reorder the data cells such that they are contiguous. One method used to reorder the data cells is described below. It is to be appreciated by a skilled technologist that other methods may be employed.

Figure 4G:
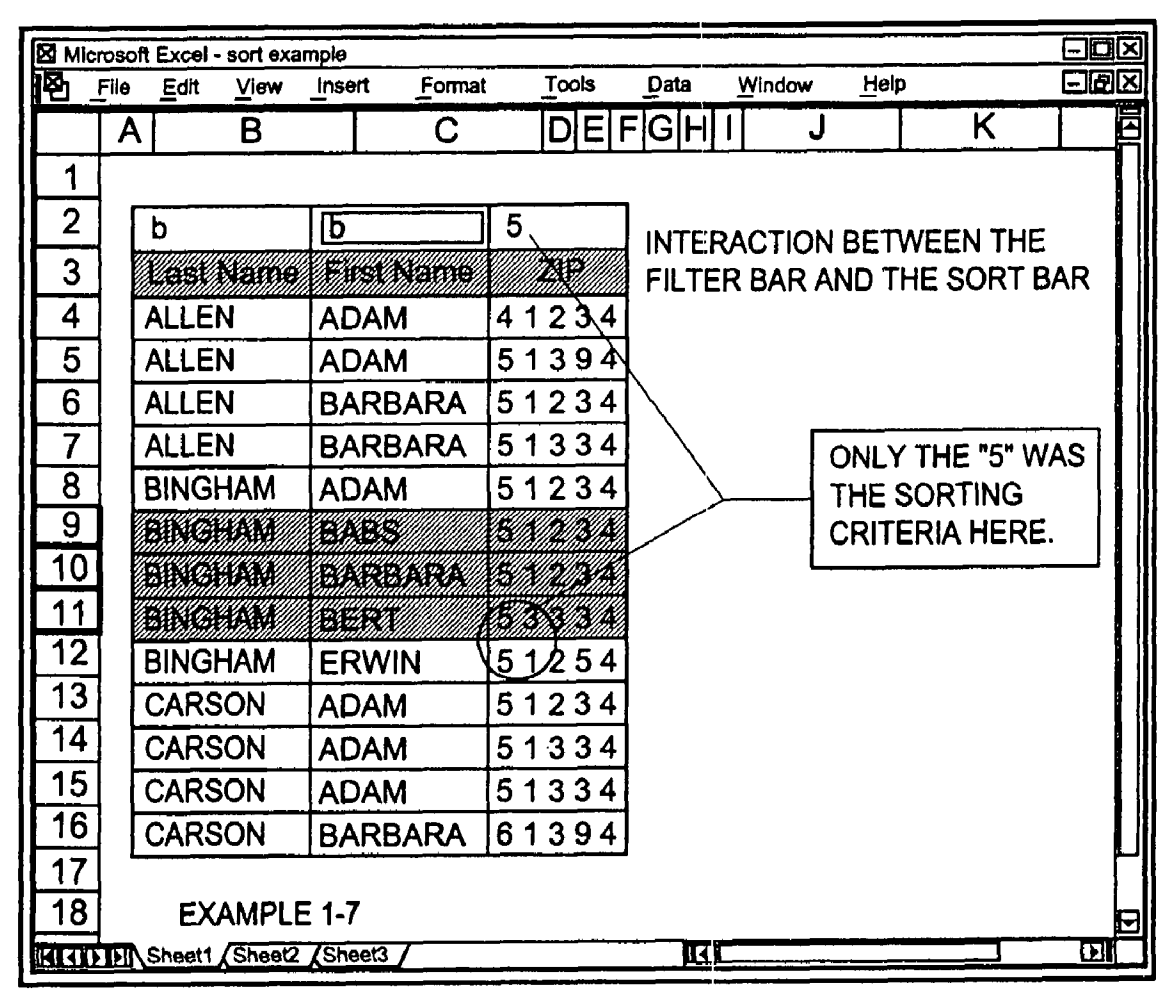

To group the data cells contiguously, at the state 328, the data management system 100 re-sorts the information bars in accordance with the sorting priority list. However, to be contrasted with the sort procedure of state 320, the data management system 100 sorts the data cells using only as many digits that were input in each of the filter cells except for the most recently used filter cell. For example, FIG. 4G shows the results of the foregoing sorting methods. In the example, the user input the "b" in the filter cell for the first column, the number "5" in the filter cell for the third column, and then letter "b" in the filter cell for the second column. In this example, the data management system performs a primary sorting of the information bars based upon the first digit in the last name, i.e., since only one character was input the first column, a secondary sort on the information bars based upon the first digit in the zip code, i.e., again since only one character was input into the third column, and a tertiary sort of the data cells using the entire contents of the first name, i.e., because it is the most recently used filter cell.

Figure 12:
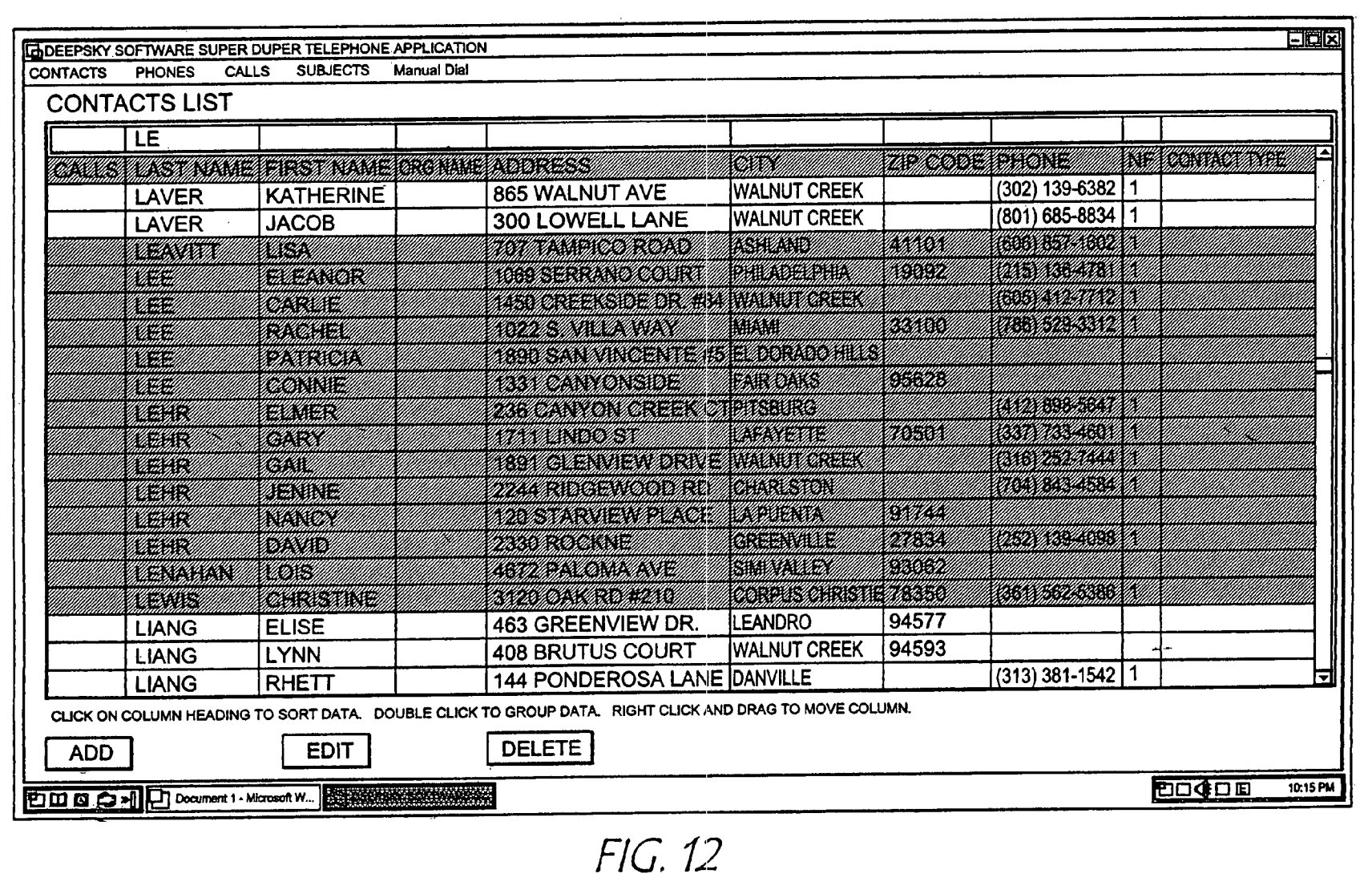

Continuing to a state 332 from either one of the states 316, 324, or 328, as can be seen in FIGS. 4C, 4E, and 4G, the data cells are now sorted and the data cells that satisfy the filter criteria are contiguously grouped. Furthermore, in one embodiment of the invention, the data cells that satisfy the filter criteria are shown in the context of those data cells that do not satisfy the filter criteria. As is seen in FIG. 12, in one embodiment, the topmost information bar satisfying the filter criteria should be about ⅓ from the top of the table 400 to provide one desirable contextual display of sorted data items.

Proceeding to a decision state 336 (FIG. 3), the data management system 100 determines whether the user selected any of the sort cells of any of the columns. If the user selected one of the sort cells of one of the columns, the data management system 100 proceeds to a state 340 wherein the respective column is moved to the first place, i.e., the highest sorting priority, in the sorting priority list. The data management system 100 then returns to the state 320 to resort the information bars. Referring again to the decision state 336, if the sort cell of any of the columns was not pressed, the data management system 100 returns to the state 300 and awaits further filter criteria from the user. It is noted that the sorting priority list can be updated to reflect that the user deleted filter criteria from the filter cells.

In one embodiment of the invention, the identification and highlighting of data cells (state 308) and sorting (state 316) is performed immediately in response to receiving the filter criteria. Thus, in this embodiment, a user would not see intermediate displays showing highlighted data cells that are not sorted such as is shown in FIGS. 4B, 4D, and 4F.

Figure 5:
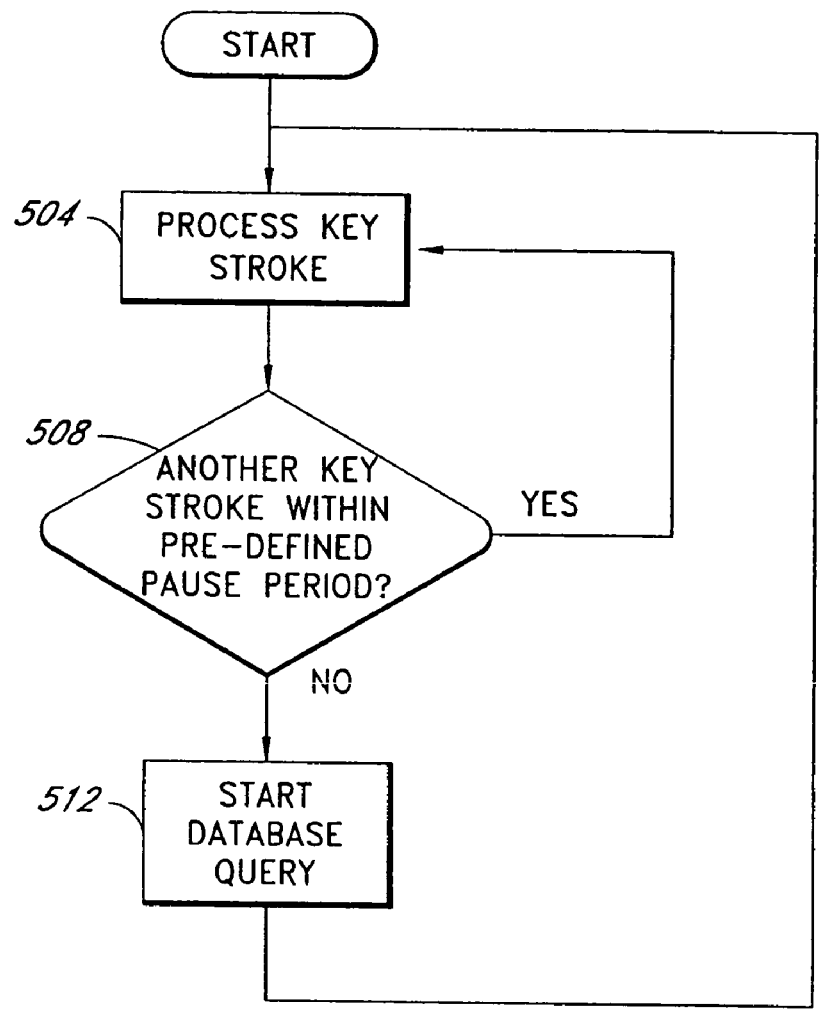
FIG. 5 is a flowchart illustrating one embodiment of a process by which the data management system of FIG. 1 receives filter criteria from a user.

FIG. 5 is a flowchart illustrating a process of receiving the filter criteria by the user. As discussed above, in one embodiment of the invention, the table 400 is updated on the screen in response to receiving character-by-character filter criteria input from the user. This method can be disadvantageous in certain systems wherein the database 225 is remote from the computer 110 and there is a delay in retrieving information from the database. Depending on the circumstances, it may be beneficial to wait a predetermined time period after receiving a character of filter criteria to allow the user to enter one or more characters before updating the table 400.

Under these conditions, for example, the database management system starts at a state 504 and receives a keystroke. Next, at a decision state 508, the data management system 100 waits a predefined period of time before submitting a database query and updating the data table. If another key stroke is detected within the predefined time period, the database management system 100 returns to the state 504 to process another key stroke. However, if the predefined time period lapses, the data management system 100 proceeds to a state 512 and submits a new database query that is based at least in part upon the provided filter criteria and performs the filtering and sorting discussed above.

Figure 6:
FIG. 6 is an exemplary screen display that may be generated by the data management system of FIG. 1.
Figure 7:
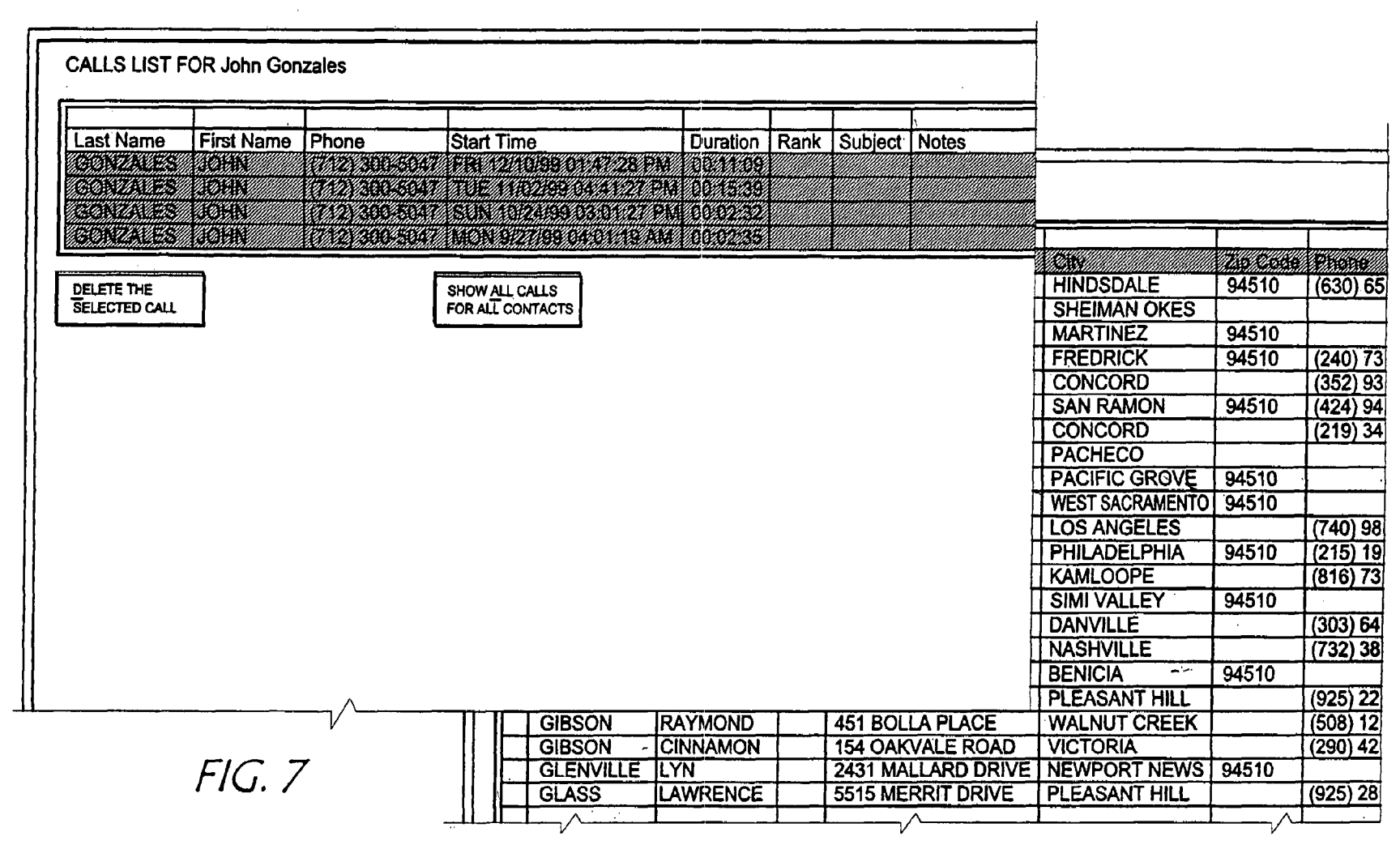

FIGS. 6 and 7 each illustrates alternative embodiments of the invention. In the embodiment of the invention shown in FIG. 6, the data management system 100 modifies the table 400 such that only the information bars that satisfy the filter criteria are displayed to the user. In the embodiment of the invention shown in FIG. 7, the data management system 100 displays data cells that satisfy the received filter criteria in a second window that is separate from the original window that contained the satisfying and non-satisfying data cells. The second window also includes a plurality of filter cells so as to allow the user to provide filter criteria for each of the columns.

FIG. 8 is a diagram illustrating how certain wildcard characters may be used as filter criteria. As can be seen in FIG. 8, a user may input an asterisk 800 for a wildcard string and a question mark 804 for a wildcard character in the entered string. The associated results of each filter criteria sort is shown in FIG. 8.

Figure 9:
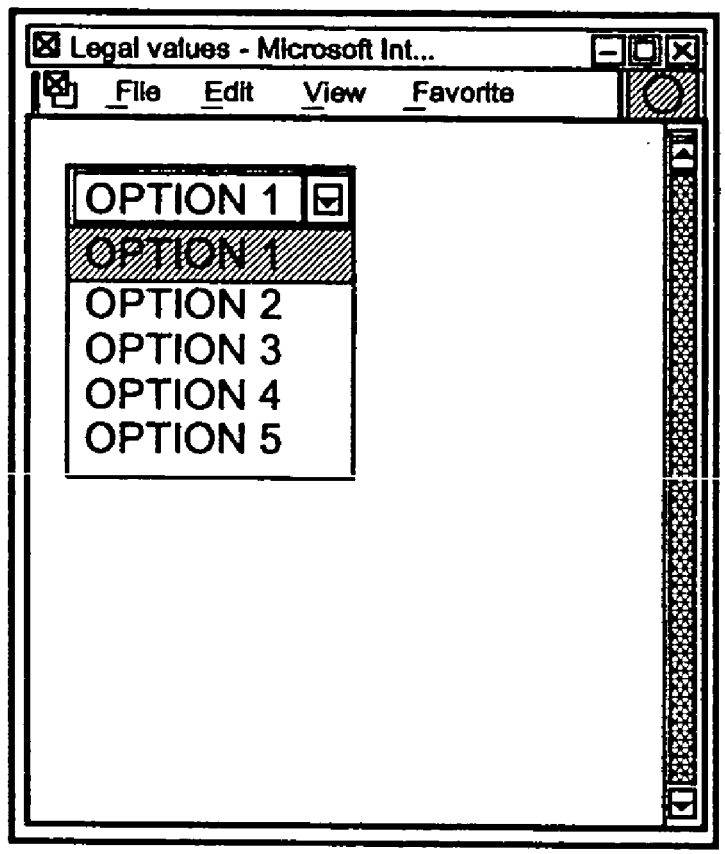
FIG. 9 is an exemplary screen display representationally showing predefined legal filter criteria that may be selected by a user of the data management system of FIG. 1.

FIG. 9 is a screen display showing that the user can select from one or more predetermined values when entering filter criteria. As is shown in FIG. 9, a pull-down menu can be used to select from one of five options, i.e., "option1", "option2", "option 3", "option 4", and "option5", wherein each of the options is predetermined. It is to be appreciated that the options shown in FIG. 9 are representational and that the actual values may be built into the data management system 100, or alternatively, defined by the user.

Figure 10:
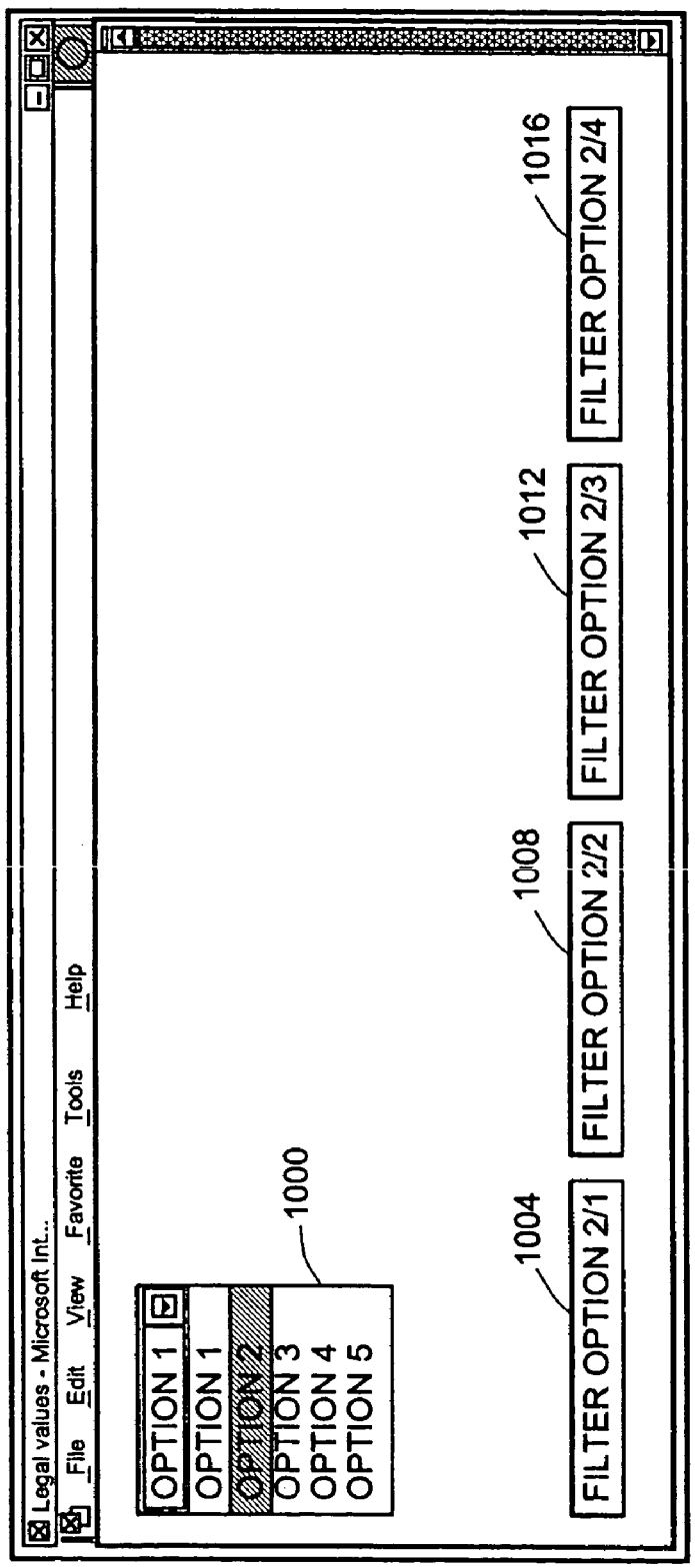
FIG. 10 is another exemplary screen display representationally showing predefined sets of legal values that may be selected by the user of the data management system of FIG. 1.

FIG. 10 is a screen display illustrating an aspect of the data management system 100 wherein the user can select a set of filter criteria for insertion into the filter cells. For example, as is shown in FIG. 10, five different sets of filter criteria 1000 can be selected. In response to selection of one of the filter criteria, the data management system 100 inserts the filter criteria into respective ones of filter cells 1004, 1008, 1012, and 1016. As is shown in FIG. 10, the user has selected the "Option2" filter criteria, and in response thereto, the data management system has inserted "FilterOption2/1" in filter cell 1004, "FilterOption2/2" in filter cell 1008, "FilterOption3/1" in filter cell 1008, and "FilterOption2/4" in filter cell 1016. It is to be appreciated that the term "FilterOption" followed by a suffix is used to representationally describe any type of predefined filter criteria. Naturally, for a given option, one or more of the individual filter criteria may be null. In one embodiment of the invention, the content of the filter sets is definable by the user via a graphical interface that is provided by the data management system 100.

Figure 11:
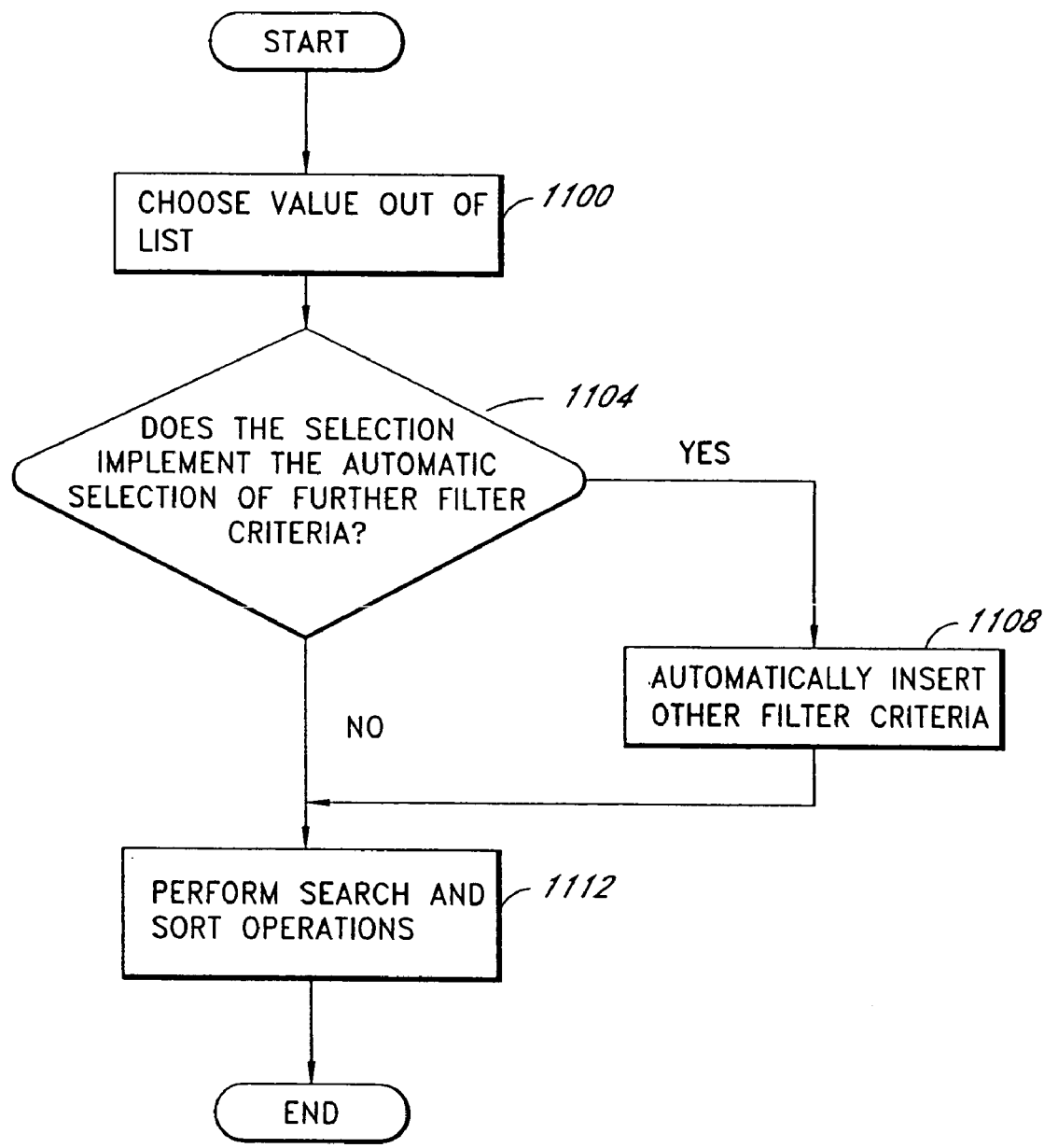
FIG. 11 is a flowchart illustrating one embodiment of a process for selecting a predefined legal value to be used as filter criteria, which forms a part of the data management system of FIG. 1.

FIG. 11 is a flowchart illustrating a process by which the data management system 100 receives predefined filter criteria in a selected cell from a user which thereby causes other filter criteria to be inserted in other filter cells. Starting at a state 1100, a user can select one or more of the predefined values. Continuing to a decision state 1104, the data management system 100 determines whether the selection of the predetermined value triggers the automatic selection of other predetermined values. If the selection of the predetermined value triggers the selection of other predetermined values, the data management system 100 proceeds to a state 1108. At the state 1108, the data management system 100 automatically inserts and applies certain filter criteria to the other filter cells. From state 1108 or, alternatively, if the selection of the predetermined value does not trigger the automatic selection of other predetermined values, the data management system 100 proceeds to a state 1112. At the state 1112, the data management system 100 performs the search and sort operations discussed above with respect to FIG. 3. In one embodiment of the invention, the predetermined value triggers may be defined by a user via a graphical user interface that is provided by the data management system 100.

In one embodiment, the data management system 100 allows users to see the filtered data in real-time in response to character-by-character input of filter criteria. The data management system 100 includes a filter cell for each of the columns in the data table. By simply inputting text into one of the filter cells, the information bars in the table are automatically filtered and sorted. Furthermore, the data management system 100 also allows the user to see the information bars that satisfy the filter criteria in the context of the information bars that do not satisfy the filter criteria. The sorting process of the data management system 100 increases the likelihood that the user can find desired data on the same screen as the data cells that satisfy the filter criteria even with improperly formed filter criteria. Such immediate feedback allows the user to quickly identify errors in the filter criteria. Moreover, the data management system 100 records a sorting priority list based upon the order in which the user entered filter criteria in the filter cells. The priority sorting allows the information bars to be rearranged in a way that meets the user's probable expectations.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. The scope of the invention is indicated by the appended claims rather than by the foregoing description. All changes which come within the meaning and range of equivalency of the claims are to be embraced within their scope.

What is claimed is:

1. A method of managing data, the method comprising:
    displaying a table comprising a one or more rows and columns of data cells having data that belongs to one or more data sets, the table further comprising one or more filter cells, wherein the filter cells comprise interactive display elements configured to receive input from a user for whom the table is displayed;
    automatically inserting one or more filter criteria into at least one of the filter cells in response to a selection by a user;
    identifying data cells in the table that satisfy the filter criteria in the filter cells;
    sorting one or more data sets that include the identified data cells; and
    displaying the sorted data sets such that the identified data cells are displayed contiguously and interposed between data cells in the table that do not satisfy the filter criteria in the filter cells, wherein the data cells are identified, sorted, and displayed in response to the selection of the filter criteria, and wherein the data sets associated with the identified data cells are graphically displayed to a user including a highlight, a color or an other image marking that is different from the highlight, the color, or the image marking of the data cells in the table that do not satisfy the filter criteria in the filter cells.

2. A method in accordance with claim 1, wherein the one or more filter criteria is predefined in a computer memory.

3. A method in accordance with claim 1, wherein automatically inserting the one or more filter criteria into at least one of the filter cells in response to a selection of the one or more filter criteria by a user further comprises:
    determining whether the selection by the user triggers automatic insertion of the one or more filter criteria into the filter cells.

4. A method of managing data, the method comprising:
    displaying, in a window of a display, one or more filter cells and a table including one or more rows and columns of data cells, wherein each data cell includes content that belongs to one or more data sets, wherein each of the data cells is associated with at least one of the filter cells, and wherein the filter cells comprise interactive display elements configured to receive input from a user for whom the window of the display is displayed;
    automatically inserting predefined filter criteria into selected filter cells in response to a user selection;
    identifying data cells that have content that satisfies the predefined filter criteria of an associated filter cell; and
    sorting data sets that include the identified data cells.

5. A method in accordance with claim 4, wherein the predefined filter criteria is stored in a computer memory.

6. A method of managing data, the method comprising:
    displaying, in a window of a display, a plurality of filter cells and a table including a plurality of rows and columns of data cells, wherein each data cell includes content that belongs to one or more data sets, wherein each of the data cells is associated with at least one of the filter cells, wherein each of the columns or rows is associated with a sort procedure, and wherein the filter cells comprise interactive display elements configured to receive input from a user for whom the window of the display is displayed;

receiving filter criteria via user interaction with one or more of the filter cells;

identifying data cells in the table that have content that satisfies the filter criteria of an associated filter cell;

sorting data sets that include the identified data cells, wherein the sorting is based in part upon at least one sort procedure; and displaying the sorted data sets contiguously and interposed between data sets that are not associated with the identified data cells.

7. A method in accordance with claim 6, wherein receiving filter criteria via the user interaction with the one or more of the filter cells further comprises:

receiving the filter criteria in response to a selection of a predefined filter criteria by the user; and automatically inserting the predefined filter criteria into one or more of the filter cells.

8. A method in accordance with claim 7, wherein a predefined set of filter criteria is stored in a computer memory.

9. A method in accordance with claim 6, further comprising ending display of the data sets that are not associated with the identified data cells.

10. A method in accordance with claim 9, wherein ending display of the data sets that are not associated with the identified data cells is based at least in part on user input.

11. A method in accordance with claim 6, wherein displaying the sorted data sets further includes displaying the sorted data sets in the table at a position at approximately one-third of the height of the table.

12. A method in accordance with claim 6, wherein the identified data cells are positioned automatically within the data table, vertically and horizontally as necessary, so that the identified data cells are displayed in the window at a level and position suitable for viewing by the user.

13. A method in accordance with claim 6, further comprising removing a row data set from a group of marked identified row data sets in response to user interaction.

14. A method in accordance with claim 6, further comprising identifying one or more unmarked row data sets and marking and adding the identified one or more row data sets to a group of identified data sets in response to user interaction.

15. A method of managing data, the method comprising:

displaying, in a window of a display, a plurality of filter cells and a table including a plurality of rows and columns of data cells, wherein each data cell includes content that belongs to one or more data sets, wherein each of the data cells is associated with at least one of the filter cells, wherein each of the columns or rows is associated with a sort procedure, and wherein the filter cells comprise interactive display elements configured to receive input from a user for whom the window of the display is displayed;

receiving filter criteria via user interaction with one or more of the filter cells;

identifying data cells in the table that have content that satisfies the filter criteria of an associated filter cell;

sorting the data sets that include the identified data cells, wherein the sorting is based in part upon at least one sort procedure; and displaying the sorted data sets in response to one of
a) character-by-character input into the filter cells, or
b) lapse of a preset pause period during which no character is input into any of the filter cells.

16. A method in accordance with claim 15, further comprising:

receiving the filter criteria in response to a selection of a predefined filter criteria by the user; and automatically inserting the predefined filter criteria into one or more of the filter cells.

17. A method in accordance with claim 16, wherein the predefined filter criteria is stored in a computer memory.

18. A method of managing data, the method comprising:

displaying, in a single window of a display, a plurality of filter cells and a table including a plurality of rows and columns of data cells, wherein each data cell includes content that belongs to one or more data sets, wherein each of the data cells is associated with at least one of the filter cells, wherein each of the columns or rows is associated with a sort procedure, and wherein the filter cells comprise interactive display elements configured to receive input from a user for whom the window of the display is displayed;

sorting the data sets based in part upon at least one of the sort procedures;

receiving user-defined filter criteria via user interaction with one or more of the filter cells within the window; and identifying data cells in the table that have content that satisfies the user-defined filter criteria of an associated filter cell.

19. A method in accordance with claim 18, further comprising:

receiving the user-defined filter criteria in response to a selection of a predefined filter criteria by the user; and automatically inserting the user-defined predefined filter criteria into one or more of the filter cells.

20. A method in accordance with claim 19, further comprising storing the predefined filter criteria in a computer memory.

21. A method of managing data, the method comprising:

displaying, in a window of a display, a plurality of filter cells and a table including a plurality of rows and columns of data cells, wherein each data cell includes content that belongs to one or more data sets, wherein each of the data cells is associated with at least one of the filter cells, wherein each of the columns or rows is associated with a sort procedure, and wherein the filter cells comprise interactive display elements configured to receive input from a user for whom the window of the display is displayed;

receiving filter criteria via user interaction with one or more of the filter cells;

identifying data cells in the table that have content that satisfies the filter criteria of an associated filter cell;

computing a sorting priority list, wherein the sorting priority list is based at least in part on the filter criteria; and sorting the data sets associated with the identified data cells based at least in part upon the sorting priority list.

22. A method in accordance with claim 21, further comprising:

receiving the filter criteria in response to a selection of a predefined filter criteria by the user; and automatically inserting the predefined filter criteria into one or more of the filter cells.

23. A method in accordance with claim 22, wherein the predefined filter criteria is stored in a computer memory.

24. A method of managing data, the method comprising:
displaying, in a window of a display, a plurality of filter cells and a table including a plurality of rows and columns of data cells, wherein each data cell includes content that belongs to one or more data sets, wherein each of the data cells is associated with at least one of the filter cells, wherein each of the columns or rows is associated with a sort procedure, and wherein the filter cells comprise interactive display elements configured to receive input from a user for whom the window of the display is displayed;
receiving filter criteria via user interaction with one or more of the filter cells;
identifying data cells in the table that have content that satisfies the filter criteria of an associated filter cell;
providing a sorting priority list that defines an order for sort procedures, wherein the sorting priority list is based at least in part upon a number of characters in the filter criteria that are received via the user interaction with one or more filter cells; and
sorting the data sets that include the identified data cells based on the sort procedures, wherein the sorting is done in the order defined by the sorting priority list.

25. A method in accordance with claim 24, further comprising:
receiving the filter criteria in response to a selection of a set of filter criteria by the user; and
automatically inserting the set of filter criteria into one or more of the filter cells.

26. A method in accordance with claim 25, wherein the set of filter criteria is stored in a computer memory.

27. A method of managing data, the method comprising:
displaying, in a window of a display, one or more filter cells and a table including one or more rows and columns of data cells, wherein each data cell includes content that belongs to one or more data sets, wherein each of the data cells is associated with at least one of the filter cells, and wherein the filter cells comprise interactive display elements configured to receive input from a user for whom the window of the display is displayed;
automatically inserting predefined filter criteria into selected filter cells in response to a user selection, wherein the predefined filter criteria have been previously defined for selected filter cells;
identifying data cells in the table that have content that satisfies the filter criteria of an associated filter cell; and
sorting the data sets that include the identified data cells.

28. A method in accordance with claim 27, wherein the content of each one of the data cells is selectable by a user to become user-defined filter criteria for the row or column associated with the selected content.

29. A method in accordance with claim 27, wherein automatically inserting predefined filter criteria into at least one of the filter cells in response to a user selection further comprises:
determining whether the user selection triggers automatic insertion of the predefined filter criteria in the filter cells.

30. A method in accordance with claim 27, wherein the predefined filter criteria are stored in a computer memory.

31. A method of managing data, the method comprising:
displaying, in a window of a display, a plurality of filter cells and a table including a plurality of rows and columns of data cells, wherein each data cell includes content that belongs to one or more data sets, wherein each of the data cells is associated with at least one of the filter cells, wherein each of the columns or rows is associated with a sort procedure, and wherein the filter cells comprise interactive display elements configured to receive input from a user for whom the window of the display is displayed;
sorting the data sets based in part upon one or more of the sort procedures;
receiving filter criteria via user interaction with one or more of the filter cells within the window; and
identifying data cells in the table that have content that satisfies the filter criteria of an associated filter cell.

32. A method in accordance with claim 31, wherein the filter criteria for at least one of the filter cells is selected from a list of predetermined values.

33. A method in accordance with claim 32, wherein one or more of the predetermined values are selectable by a user selection, and wherein data cells that satisfy at least one of the predetermined values are identified in response to the user selection.

34. A method in accordance with claim 32, further comprising, in response to the user selection, assigning the selected filter criteria to one or more other filter cells.

35. A method in accordance with claim 34, wherein sorting and identifying occur in response to the user selection.

36. A method in accordance with claim 34, further comprising displaying a set of pre-stored filter criteria for filtering two or more of the rows or columns.

37. A method in accordance with claim 36, wherein the set of pre-stored filter criteria is selectable by a user selection, and wherein sorting and identifying occur in response to the user selection.

38. A method in accordance with claim 31, further comprising displaying the identified data cells, wherein the identified data cells are graphically displayed including a highlight, a color or an other image marking, and wherein the highlight, the color, or the image marking is automatically applied to at least some of the identified data cells that satisfy the filter criteria.

39. A method in accordance with claim 31, further comprising saving the content in one or more of the filter cells into a list of pre-stored filter queries.

40. A method in accordance with claim 39, further comprising automatically filling one or more filter cells from the list of pre-stored filter queries.

41. A method in accordance with claim 31, wherein the content that belongs to a data set includes one or more links to related information outside the data set.

42. A method in accordance with claim 41, wherein the one or more links include at least one Internet address related to the data set.

43. A method of managing data, the method comprising:
displaying, in a window of a display, a plurality of filter cells and a table including a plurality of rows and columns of data cells, wherein each data cell includes content that belongs to one or more data sets, wherein each of the data cells is associated with at least one of the filter cells, wherein each of the columns or rows is associated with a sort procedure, and wherein the filter cells comprise interactive display elements configured to receive input from a user for whom the window of the display is displayed;
receiving filter criteria via user interaction with one or more of the filter cells;

identifying data cells in the table that have content that satisfies the filter criteria of an associated filter cell;

sorting the data sets that include the identified data cells, wherein the sorting is based in part upon at least one sort procedure; and displaying at least the identified data cells, wherein the identified data cells are graphically displayed including a highlight, a color or an other image marking, and wherein the highlight, the color, or the image marking is automatically applied to at least some of the identified data cells that satisfy the filter criteria.

44. A method in accordance with claim 43, further comprising:

receiving the filter criteria in response to a selection of a predefined filter criteria by the user; and automatically inserting the predefined filter criteria into one or more of the filter cells.

45. A method in accordance with claim 44, wherein a predefined set of filter criteria is stored in a computer memory.

46. A system for managing data, the system comprising:

a first module configured to display, in a window of a display, one or more filter cells and a table including one or more rows and columns of data cells, wherein each data cell includes content that belongs to one or more data sets, and wherein each of the data cells is associated with at least one of the filter cells, and wherein the filter cells comprise interactive display elements configured to receive input from a user for whom the window of the display is displayed;

a second module configured to automatically insert predefined filter criteria into selected filter cells in response to a user selection;

a third module configured to identify data cells in the table that have content that satisfies the predefined filter criteria of an associated filter cell; and a fourth module configured to sort the data sets that include the identified data cells, wherein the first module, the second module, the third module, and the fourth module reside on and can be executed on one or more data processing machines.

47. A system for managing data, the system comprising:

means for displaying, in a window of a display, one or more filter cells and a table including one or more rows and columns of data cells, wherein each data cell includes content that belongs to one or more data sets, and wherein each of the data cells is associated with at least one of the filter cells, and wherein the filter cells comprise interactive display elements configured to receive input from a user for whom the window of the display is displayed;

means for automatically inserting predefined filter criteria into selected filter cells in response to a user selection;

means for identifying data cells in the table that have content that satisfies the predefined filter criteria of an associated filter cell; and means for sorting the data sets that include the identified data cells.

48. A computer readable medium storing a program which performs a method of managing data, the program comprising:

code for displaying, in a window of a display, one or more filter cells and a table including one or more rows and columns of data cells, wherein each data cell includes content that belongs to one or more data sets, and wherein each of the data cells is associated with at least one of the filter cells, and wherein the filter cells comprise interactive display elements configured to receive input from a user for whom the window of the display is displayed;

code for automatically inserting predefined filter criteria into selected filter cells in response to a user selection;

code for identifying data cells in the table that have content that satisfies the predefined filter criteria of an associated filter cell; and code for sorting the data sets that include the identified data cells.

* * * * *

INTER PARTES REEXAMINATION CERTIFICATE (941st)
United States Patent
Gorman

(10) Number: US 7,370,047 C1
(45) Certificate Issued: *Aug. 22, 2014

(54) SYSTEM AND METHOD FOR FILTERING AND SORTING DATA

(75) Inventor: John G. Gorman, Del Mar, CA (US)

(73) Assignee: Deep Sky Software, Inc., San Diego, CA (US)

Reexamination Request:
No. 95/000,626, Apr. 25, 2011

Reexamination Certificate for:
Patent No.: 7,370,047
Issued: May 6, 2008
Appl. No.: 10/776,440
Filed: Feb. 10, 2004

( * ) Notice: This patent is subject to a terminal disclaimer.

Related U.S. Application Data

(63) Continuation of application No. 09/823,406, filed on Mar. 30, 2001, now Pat. No. 6,738,770.

(51) Int. Cl.
*G06F 17/30* (2006.01)
*G06F 17/00* (2006.01)

(52) U.S. Cl.
USPC .................................. 707/752; 707/999.102

(58) Field of Classification Search
None
See application file for complete search history.

(56) References Cited

To view the complete listing of prior art documents cited during the proceeding for Reexamination Control Number 95/000,626, please refer to the USPTO's public Patent Application Information Retrieval (PAIR) system under the Display References tab.

*Primary Examiner* — Joshua Campbell

(57) ABSTRACT

System and method for filtering and sorting data. The system includes data management system for displaying a data table having a plurality of rows and columns of data cells. Each of the columns in the data table has an associated filter cell whereby the user may input filter criteria. In response to receiving the filter criteria in the filter cells, a data management system filters and sorts each of the data cells in the data table. In one embodiment of the invention, the data management system records the order in which the user inputs the filter criteria and generates a sorting priority list that defines a sorting priority for the data cells. The data management system sorts the data cells using the sorting priority list. Furthermore, in one embodiment of the invention, the data management system displays the data cells that satisfy the filter criteria contiguously and interleaved between those data cells that do not satisfy the filter criteria.

At the time of issuance and publication of this certificate, the patent remains subject to pending reissue application number 12/800,142 filed May 6, 2010. The claim content of the patent may be subsequently revised if a reissue patent is issued from the reissue application.

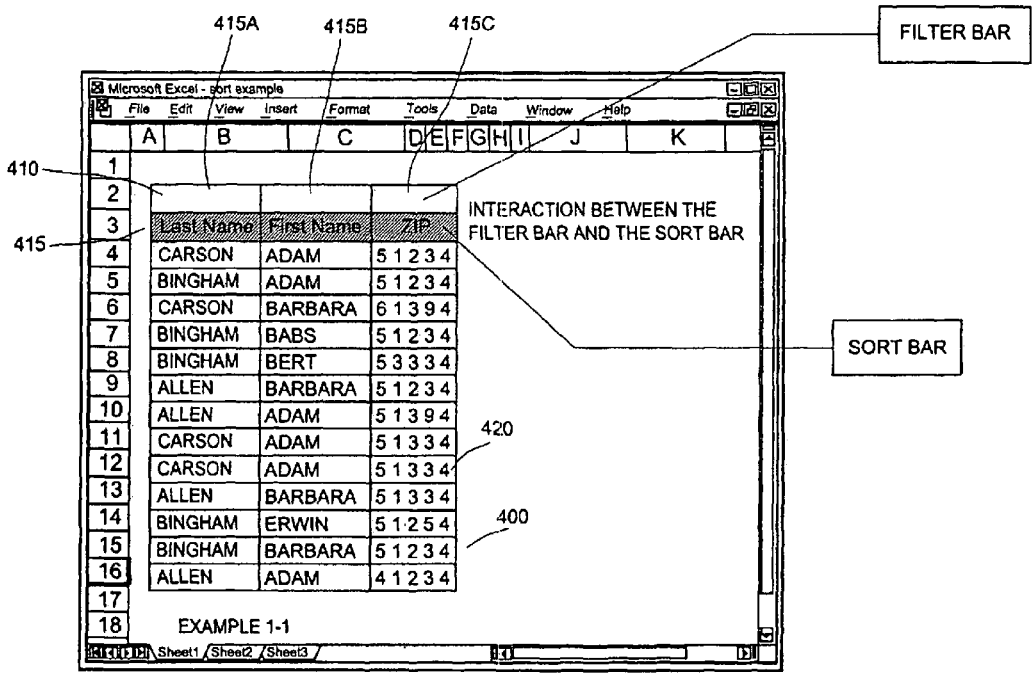

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 4, 5, 15-23, 27-38 and 43-48 are cancelled.

Claims 1-3, 6-14, 24-26 and 39-42 were not reexamined.

\* \* \* \* \*